(12) United States Patent
Matveev et al.

(10) Patent No.: US 11,960,934 B2
(45) Date of Patent: *Apr. 16, 2024

(54) SYSTEMS AND METHODS FOR IMPROVED NEURAL NETWORK EXECUTION

(71) Applicant: Neuralmagic Inc., Somerville, MA (US)

(72) Inventors: Alexander Matveev, Cambridge, MA (US); Nir Shavit, Cambridge, MA (US)

(73) Assignee: NEURALMAGIC, INC., Somerville, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/882,898

(22) Filed: Aug. 8, 2022

(65) Prior Publication Data
US 2022/0383068 A1 Dec. 1, 2022

Related U.S. Application Data

(63) Continuation of application No. 16/426,609, filed on May 30, 2019, now Pat. No. 11,449,363.
(Continued)

(51) Int. Cl.
G06F 9/50 (2006.01)
G06F 9/38 (2018.01)
(Continued)

(52) U.S. Cl.
CPC .......... G06F 9/5016 (2013.01); G06F 9/3877 (2013.01); G06F 9/544 (2013.01);
(Continued)

(58) Field of Classification Search
CPC ...... G06F 9/5016; G06F 9/3877; G06F 9/544; G06F 12/084; G06F 12/0875;
(Continued)

(56) References Cited

U.S. PATENT DOCUMENTS 5,577,166 A 11/1996 Mizuno
9,558,156 B1 1/2017 Bekas et al.
(Continued)

FOREIGN PATENT DOCUMENTS

CN 107832839 3/2018
EP 3037980 6/2016
(Continued)

OTHER PUBLICATIONS

Kurtz, Mark, et al. "Inducing and Exploiting Activation Sparsity for Fast Neural Network Inference." Proceedings of the International Conference on Machine Learning. 2020.
(Continued)

Primary Examiner — Maurice L. McDowell, Jr.
(74) Attorney, Agent, or Firm — PEARL COHEN ZEDEK LATZER BARATZ LLP

(57) ABSTRACT

A method and system for computing one or more outputs of a neural network having a plurality of layers is provided. The method and system can include determining a plurality of sub-computations from total computations of the neural network to execute in parallel wherein the computations to execute in parallel involve computations from multiple layers. The method and system also can also include avoiding repeating overlapped computations and/or multiple memory reads and writes during execution.

20 Claims, 10 Drawing Sheets

Related U.S. Application Data

(60) Provisional application No. 62/678,757, filed on May 31, 2018.

(51) Int. Cl.
    *G06F 9/54*           (2006.01)
    *G06F 12/084*       (2016.01)
    *G06N 3/04*          (2023.01)
    *G06N 3/045*        (2023.01)
    *G06N 3/08*          (2023.01)
    *G06N 3/084*        (2023.01)

(52) U.S. Cl.
    CPC .............. *G06F 12/084* (2013.01); *G06N 3/04* (2013.01); *G06N 3/045* (2023.01); *G06N 3/08* (2013.01); *G06N 3/084* (2013.01)

(58) Field of Classification Search
    CPC .... G06F 2212/454; G06N 3/04; G06N 3/045; G06N 3/08; G06N 3/084
    See application file for complete search history.

(56) References Cited

U.S. PATENT DOCUMENTS

| | | |
|---|---|---|
| 9,811,775 B2 | 11/2017 | Krizhevsky et al. |
| 9,818,059 B1 | 11/2017 | Woo et al. |
| 10,157,045 B2 | 12/2018 | Venkataramani et al. |
| 10,223,333 B2 | 3/2019 | Chetlur et al. |
| 10,572,568 B2 | 2/2020 | Narayanamoorthy et al. |
| 10,685,082 B2 | 6/2020 | Bekas et al. |
| 10,719,323 B2 | 7/2020 | Baum et al. |
| 11,449,363 B2 * | 9/2022 | Matveev ................ G06N 3/04 |
| 2008/0281767 A1 * | 11/2008 | Garner ................ G05B 13/027 706/25 |
| 2010/0076915 A1 | 3/2010 | Xu et al. |
| 2011/0119467 A1 | 5/2011 | Cadambi et al. |
| 2013/0138589 A1 | 5/2013 | Yu et al. |
| 2016/0224465 A1 | 8/2016 | Morad et al. |
| 2016/0328643 A1 | 11/2016 | Liu et al. |
| 2016/0350645 A1 | 12/2016 | Brothers et al. |
| 2016/0358070 A1 | 12/2016 | Brothers et al. |
| 2017/0103313 A1 | 4/2017 | Ross et al. |
| 2017/0132496 A1 | 5/2017 | Shoaib et al. |
| 2017/0169567 A1 | 6/2017 | Chefd'Hotel et al. |
| 2017/0193136 A1 | 7/2017 | Prasad et al. |
| 2017/0193361 A1 | 7/2017 | Chilimbi et al. |
| 2017/0200094 A1 | 7/2017 | Bruestle et al. |
| 2017/0316311 A1 | 11/2017 | Pilly et al. |
| 2017/0032487 A1 | 12/2017 | Ashari et al. |
| 2017/0372202 A1 | 12/2017 | Ginsburg et al. |
| 2018/0088996 A1 * | 3/2018 | Rossi ................ G06F 9/5016 |
| 2018/0096226 A1 | 4/2018 | Aliabadi et al. |
| 2018/0173571 A1 | 6/2018 | Huang et al. |
| 2018/0197068 A1 * | 7/2018 | Narayanaswami .... G06N 3/045 |
| 2018/0253402 A1 | 9/2018 | Redfern et al. |
| 2018/0315159 A1 | 11/2018 | Ould-Ahmed-Vall et al. |
| 2018/0322390 A1 | 11/2018 | Das et al. |
| 2018/0336468 A1 | 11/2018 | Kadav et al. |
| 2019/0042250 A1 | 2/2019 | Anders et al. |
| 2019/0042542 A1 | 2/2019 | Narayanamoorthy et al. |
| 2019/0056916 A1 | 2/2019 | Varma et al. |
| 2019/0156206 A1 | 5/2019 | Graham et al. |
| 2019/0370071 A1 | 5/2019 | Mateev et al. |
| 2019/0179818 A1 | 6/2019 | Lee |
| 2019/0212982 A1 | 7/2019 | Yoda et al. |
| 2019/0303743 A1 | 10/2019 | Venkataramani et al. |
| 2019/0324759 A1 * | 10/2019 | Yang ................ G06F 9/3867 |
| 2019/0354894 A1 | 11/2019 | Lazovich et al. |
| 2019/0370644 A1 | 12/2019 | Kenney et al. |
| 2020/0034710 A1 | 1/2020 | Sidhu et al. |
| 2020/0089534 A1 | 3/2020 | Chen et al. |
| 2020/0090024 A1 | 3/2020 | Chen et al. |
| 2020/0097826 A1 | 3/2020 | Du et al. |
| 2020/0104717 A1 | 4/2020 | Alistarh |
| 2020/0160181 A1 | 5/2020 | Zlateski et al. |
| 2020/0160182 A1 | 5/2020 | Matveev et al. |
| 2020/0193274 A1 | 6/2020 | Darvish Rouhani et al. |
| 2020/0218978 A1 | 7/2020 | Kopinsky |
| 2020/0285892 A1 | 9/2020 | Baum et al. |
| 2020/0342301 A1 | 10/2020 | Miao et al. |
| 2021/0350238 A1 * | 11/2021 | Lei ................ G06N 3/063 |

FOREIGN PATENT DOCUMENTS

| | | |
|---|---|---|
| WO | WO-2017/049496 | 3/2017 |
| WO | WO-2018/053835 | 3/2018 |
| WO | WO-2019/090325 | 5/2019 |
| WO | WO-2020/046859 | 3/2020 |
| WO | WO-2020/047823 | 3/2020 |
| WO | WO-2020/072274 | 4/2020 |

OTHER PUBLICATIONS

Robert Lim; "Methods for Accelerating Machine Learning in High Performance Computing"; University of Oregon—AREA-2019-01.

Zhizhou Li et al.; "A CPU-based Algorithm for Traffic Optimization Based on Sparse Convolutional Neural Networks"; 2017 IEEE 30th Canadian Conference on Electrical and Computer (CCECE).

Baoyuan Liu et al.; "Sparse Convolutional Neural Networks"; CVPR 2015—Computer Vision Foundation—IEEE.

Hesham Mostafa et al.; "Parameter Efficient Training of Deep Convolutional Neural Networks by Dynamic Sparse Reparameterization"; Proceedings of the 36 th International Conference on Machine Learning, Long Beach, California, PMLR 97, 2019.

Israt Nisa et al.; "Sampled Dense Matrix Multiplication for High-Performance Machine Learning"; 2018 IEEE 25th International Conference on High Performance Computing (Hi PC).

Yang, Huanrui, Wei Wen, and Hai Li. "Deephoyer: Learning sparser neural network with differentiable scale-invariant sparsity measures." arXiv preprint arXiv:1908.09979 (2019).

Yuster, Raphael, and Uri Zwick. "Fast sparse matrix multiplication." ACM Transactions On Algorithms (TALG) 1.1 (2005): 2-13.

Park, Jongsoo, et al. "Faster cnns with direct sparse convolutions and guided pruning." arXiv preprint arXiv:1608.01409 (2016).

Paixao, Crysttian A., and Flávio Codeço Coelho. Matrix compression methods. No. e1049. PeerJ PrePrints, 2015.

https://www.kinematicsoup.com/news/2016/9/6/data-compression-bit-packing-101; published Sep. 6, 2019.

Zhangxiaowen Gong et al. "Sparse Train: Leveraging Dynamic Sparsity in Training DNNs on General-Purpose SIMD Processors"; 2019.

Yu, Dong, Li Deng, and Frank Seide. "The deep tensor neural network with applications to large vocabulary speech recognition". IEEE Transactions on Audio Speech, and Language Processing 21.2 (2012): 388-396. (Year: 2012).

Budden et al., "Deep tensor convolution on multicores", In Proceedings of the 34th International Conference on Machine Learning, 2017, vol. 70, pp. 615-624.

Chen, Xuhao, "Escoin: Efficient Sparse Convolutional Network Inference on GPUs." From Jul. 2017 "Conference '17", Apr. 3, 2019 (Apr. 3, 2019) Retrieved on Jan. 17, 2020 (Jan. 17, 2020)from <https://arxiv .org/pdf/1802.10280.pdf> entire document.

Georganas et al., "Anatomy Of High-Performance Deep Learning Convolutions On SIMD Architectures." In: SC18: International Conference for High Performance Computing, Networking, Storage and Analysis. Aug. 20, 2018 (Aug. 20, 2018) Retrieved on Jan. 17, 2020 (Jan. 17, 2020) from <https://arxIv.org/pdf/1808.05567 .pdf> entire document.

Kaya et al., "Scalable sparse tensor decompositions in distributed memory systems", SC'15: Proceedings of the International Conference for High Performance Computing, Networking, Storage and Analysis, IEEE, 2015. (Year: 2015).

Kim et al., "Designing Vector-Friendly Compact BLAS and LAPACK Kernels", SC17, Nov. 12-17, 2017, Denver, CO, USA.

(56) References Cited

OTHER PUBLICATIONS

Lascorz etal., "Bit-Tactical: Exploiting Ineffectual Computations in Convolutional Neural Networks: Which, Why, and How", Mar. 9, 2018, arXiv:1803.03688v1.

Liu et al., "Sparse convolutional neural networks." In: Proceedings of the IEEE Conference on Computer Vision and Pattern Recognition. Jun. 12, 2015 (Jun. 12, 2015) Retrieved on Jan. 17, 2020 (Jan. 17, 2020) from <http://openaccess.thecvf.com/content_cvpr_2015/papers/Liu_Sparse_Convolutional_Neural_2015 CVPR paper.pdf> entire document.

Papyan et al., "Convolutional neural networks analyzed via convolutional sparse coding." In: The Journal of Machine Learning Research. Jul. 17, 2017 (Jul. 17, 2017) Retrieved on Feb. 20, 2020 from <http://www.jmlr.Org/papers/volume18/16-505/16-505.pdf> entire document.

Scardapane et al. "Group sparse regularization for deep neural networks.", In: Neurocomputing. Jul. 2, 2016 (Jul. 2, 2016) Retrieved on Nov. 16, 2019 (Nov. 16, 2019) from <https://arxiv.org/pdf/1607.00485.pdf> entire document.

Smith et al., "SPLATT: Efficient and parallel sparse tensor-matrix multiplication", 2015 IEEE International Parallel and Distributed Processing Symposium, IEEE, 2015, (Year: 2015).

Wozniak et al., "GiMMiK—Generating bespoke matrix multiplication kernels for accelerators: Application to high-order Computational Fluid Dynamics", Computer Physics Communications, vol. 202, 2016, pp. 12-22.

Office action for U.S. Appl. No. 16/751,962 dated Apr. 9, 2020.

Alwani et al., "Fused-layer CNN accelerators." 49th Annual IEEE/ACM International Symposium on Microarchitecture (MICRO), 2016, pp. 1-12.

Despande, Adit, A beginner's guide to understanding convolutional neural networks, Jul. 20, 2016, retrieved from Beginner%27s-Quide-to-understanding-convolutional-neinai-networks/ entire document.

Du et al., "Width Provably Matters in Optimization for Deep Linear Neural Networks", May 27, 2019, arXiv:1901,08572v3.

Gale et al., "The State of Sparsity in Deep Neural Networks", Feb. 25, 2019, arXiv:1902.09574v1.

Han et al., "Learning both Weights and Connections for Efficient Neural Networks", 2015, Advances in Neural Information Processing Systems, vol. 28.

Hinton et al., "Distilling the Knowledge in a Neural Network", Mar. 9, 2015, arXiv:1503.02531v1.

Lavin et al., "Fast Algorithms for Convolutional Neural Networks", Nov. 10, 2015, arXiv:1509.09308v2.

Lecun et al., "Optimal brain damage", Advances in neural information processing systems, 1990, pp. 598-605.

Mishra et al., "Apprentice: Using Knowledge Distillation Techniques to Improve Low-Precision Network Accuracy", Nov. 15, 2017, arXiv:1711.05852v1.

Rusu et al., "Progressive Neural Networks", Sep. 7, 2016, arXiv:1606.04671v3.

\* cited by examiner

SYSTEMS AND METHODS FOR IMPROVED NEURAL NETWORK EXECUTION

CROSS REFERENCE TO RELATED APPLICATIONS

This application is a continuation of prior U.S. patent application Ser. No. 16/426,609, entitled "SYSTEMS AND METHODS FOR IMPROVED NEURAL NETWORK EXECUTION", filed on May 30, 2019, which in turn claims benefit from US provisional patent application 62/678,757 filed on May 31, 2018 and entitled "Method for Non-Layer Cache-Aware Execution of Convolutional and Other Types of Neural Network Computations" the entire contents of each of which being incorporated herein by reference in its entirety.

FIELD OF THE INVENTION

The invention relates generally to executing neural networks; specifically to executing neural networks across at least a portion of multiple layers in parallel and based on available computer memory.

BACKGROUND

Neural networks (NN) or connectionist systems are computing systems inspired by biological computing systems, but operating using manufactured digital computing technology. NNs are made up of computing units typically called neurons (which are artificial neurons, as opposed to biological neurons) communicating with each other via connections, links or edges. In common NN implementations, the signal at the link between artificial neurons can be for example a real number, and the output of each neuron can be computed by function of the (typically weighted) sum of its inputs, such as the ReLU rectifier function. NN links or edges typically have a weight that adjusts as learning proceeds. The weight increases or decreases the strength of the signal at a connection. Typically, NN neurons are divided or arranged into layers, where different layers can perform different kinds of transformations on their inputs and can have different patterns of connections with other layers.

Such systems can learn to perform tasks by considering example input data, generally without being programmed with any task-specific rules, being presented with the correct output for the data, and self-correcting. During learning the NN can execute a forward-backward pass where in the forward pass the NN is presented with an input and produces an output, and in the backward pass (backpropagation) the NN is presented with the correct output, generates an error (e.g., a "loss"), and generates update gradients which are used to alter the weights at the links or edges.

Various types of NNs exist. For example, a convolutional neural network (CNN) can be a deep, feed-forward network, which includes one or more convolutional layers, fully connected layers, and/or pooling layers. CNNs are particularly useful for visual and/or speech applications. Other NNs can include for example long short-term memory (LSTM) networks.

In practice, a NN, or NN learning, can be simulated by one or more computing nodes or cores, such as generic central processing units (CPUs, e.g. as embodied in personal computers) or graphics processing units (GPUs such as provided by Nvidia Corporation), which can be connected by a data network. A collection of such connected computers can be termed a pod, and computers used with NNs can be single socket (e.g. one main processor) or multi-socket (e.g. multiple processors in one machine, sharing some memory). One or more computing nodes can model a NN using known data structures. During inference, the trained NN can for example recognize or categorize images, perform speech processing, or other tasks.

A NN can be modelled as an abstract mathematical object, such as a function. A NN can be translated physically to CPU or GPU as for example a sequence of matrix operations where entries in the matrix represent neurons (e.g. artificial neurons connected by edges or links) and matrix functions represent functions of the NN.

During learning, the NN, or the computing nodes modelling the NN, can be presented with training data. For example, in an image recognition application, a NN can learn to identify images that contain cats by analyzing example images that have been manually labeled as "cat" or "not a cat" and using the results to identify cats in other images. The NN can do this without any prior knowledge about cats, e.g., that they have fur, tails, whiskers and cat-like faces. Instead, during learning the NN automatically generates identifying characteristics from the learning material that it processes.

One method of training in a NN is data parallel learning, where (typically via a master node or core), the data or training sets are divided, and each core or node operates on the same NN, using forward and backward passes, on only a portion of the data independently, and after each forward/backward pass the nodes or cores exchange parameters (e.g. weights or gradients) with each other, or send them to the master, to come up with the right parameters for the iteration. For example, on each iteration, a master node can send one different image, or a set of images, and the same model of the NN, to each of four CPUs. Each CPU can execute a forward and backward pass over all layers of the model on its specific image, and send the resulting parameters to the master, which then creates an updated model from the parameters sent by all four CPUs. Each node or processor can at times store a different version (with different parameters) of the same NN.

Typical NNs can require that nodes of one layer depends upon output of a previous layer as their inputs. Current systems typically proceed in a synchronous manner, first typically executing all (or substantially all) of the outputs of a prior layer to feed the outputs as inputs to the next layer. Each layer can be executed on a set of cores synchronously (or substantially synchronously), which can require a large amount of compute power, on the order of 10s or even 100s of Terflops, or a large set of cores. On modern GPUs this can be done using 4000-5000 cores.

One difficulty with computing each layer at a time can include a requirement that memory size used to store intermediate layer values be driven by a width of the largest layer in the particular NN.

Other difficulties with current NNs include redundant calculations. More specifically, in some scenarios (e.g., convolutional layers of the network), the same computation can be performed for two or more nodes in a particular layer and/or in two different layers.

It can be desirable to execute NNs such that computations from multiple layers can be performed at the same time to, for example, to avoid bringing data into memory several times. It can also be desirable to execute NNs such that redundant computations are eliminated. It can also be desirable to execute NNs in a computing environment which can allow efficient execution of computations using less compute power. It can also be desirable to execute NNs in a computing environment that can allow for various memory sizes independently of the size of the networks being executed. It can also be desirable to execute NNs that allows for all of the computing power to be used in each execution cycle.

SUMMARY OF THE INVENTION

Advantages of the invention can include the ability to execute NNs such that computations from multiple layers can be performed at the same time, to eliminate redundant computations and/or efficient execution using less compute power. Other advantages of the invention can include the ability to execute NNs in a computing environment that can allow for various memory sizes and/or all of the computing power to be used in each execution cycle. Other advantages of the invention can include an ability to load balance execution of a NN across cores. Other advantages of the invention include for a NN executed on a CPU, an ability to avoid reading and writing to non-cache memory, thus reducing the overall time it takes to execute the NN on the CPU. Other advantages of the invention include reducing the overall number of computations necessary to execute the NN.

In one aspect, the invention involves a method for computing one or more outputs of a neural network having a plurality of layers. The method involves analyzing, by a computing device, the neural network to determine a plurality of sub-computations from total computations of the neural network. Determining each sub-computation involves i) determining a group of outputs for each sub-computation based on one layer of the plurality of layers, ii) for each group of outputs, determining a largest number of inputs in some layer that precedes the one layer that are necessary to compute the respective group of outputs and results in a memory requirement less than a memory threshold, wherein at least two of the largest numbers of inputs for the respective sub-computation overlap and span at least two layers of the plurality of layers of the neural network. The method also involves computing the outputs of the neural network by executing each sub-computation.

In some embodiments, executing each sub-computation further involves identifying a set of corresponding cores that together have a cache memory size that is at least the memory threshold. The cache memory size is a L2 or L3 cache memory size. In some embodiments, the cache memory size is the total cache size needed by the neural network to execute the computations of any intermediate layer of the respective sub-computations of the neural network. In some embodiments, determining a group of outputs for each sub-computation further involves receiving a start layer and selecting one previously unselected output from the start layer to add to the group of outputs.

In some embodiments, determining the largest number of inputs in some preceding layer that are necessary to compute the respective group of outputs and results in a memory requirement less than a memory threshold further involves receiving a bottom layer, adding all outputs in each layer neural network from the start layer traversing the bottom layer that contribute to computing the one previously unselected output into the group of outputs, and comparing the group of outputs to the memory threshold.

In some embodiments, the method involves determining each repeated computation in the plurality of sub-computations, executing each repeated computation only once, storing a result of each repeated computation, and reusing the result of each repeated computation for each sub-computation of the plurality of sub-computations that has not yet executed and has a computation that is the same as any of the repeated computations with stored results.

In some embodiments, at least some of the each repeated computations in the plurality of sub-computations is stored on a shared memory multiprocessor and accessed by multiple computing cores. In some embodiments, the plurality of sub-computations are grouped into workspaces and wherein each workspace is assigned a set of cores to execute on.

In some embodiments, the method involves determining whether to avoid computing one or more computations that repeat in the plurality of computations based on a repeat ratio, wherein the repeat ratio is based on the number of computations in the neural network and the number of computations that are repeat computations.

In some embodiments, computing the outputs of the neural network by executing each sub-computation further comprises writing outputs from computations other than a final output layer of the neural network into cache only. In some embodiments, computing the outputs of the neural network by executing each sub-computation further comprises reading outputs from computations other than a final output layer of the neural network from cache only.

In some embodiments, the neural network is a convolutional neural network. In some embodiments, the plurality of layers is any combination of a direct convolutional layer, Fast Fourier Transform layer, Winograd Transform layer, any pooling layer, any non-element-wise layer, element-wise-layer, and any Fully-Connected layer. In some embodiments, the plurality of layers is a sparsification of an original network layer.

In another aspect, the invention includes a system comprising an improved convolutional neural network (CNN). The system includes a memory and a processor. The processor is configured to analyzing, by a computing device, the neural network to determine a plurality of sub-computations from total computations of the neural network, wherein determining each sub-computation further involves determining a group of outputs for each sub-computation based on one layer of the plurality of layers, for each group of outputs, determining a largest number of inputs in some layer that precedes the one layer that are necessary to compute the respective group of outputs and results in a memory requirement less than a memory threshold, wherein at least two of the largest number of inputs for the respective sub-computation overlap and span at least two layers of the plurality of layers of the neural network. The processor is also configured to computing the outputs of the neural network by executing each sub-computation.

In some embodiments, determining each repeated computation in the plurality of sub-computations, executing each repeated computation only once, storing a result of each repeated computation, and reusing the result of each repeated computation for each sub-computation of the plurality of sub-computations that has not yet executed and has a computation that is the same as any of the repeated computations with stored results.

In some embodiments, at least some of the each repeated computations in the plurality of sub-computations is stored on a shared memory multiprocessor and accessed by multiple computing cores.

In another aspect, the invention involves a non-transitory computer readable storage medium storing a set of instructions for causing a computer to generate a performance rating for a developer, by performing the operations of analyzing the neural network to determine a plurality of sub-computations from total computations of the neural network, wherein determining each sub-computation further involves determining a group of outputs for each sub-computation based on one layer of the plurality of layers. The computer is further caused to for each group of outputs, determining a largest number of inputs in some layer that precedes the one layer that are necessary to compute the respective group of outputs and results in a memory requirement less than a memory threshold, wherein at least two of the largest number of inputs for the respective sub-computation overlap and span at least two layers of the plurality of layers of the neural network. The computer is further caused to computing the outputs of the neural network by executing each sub-computation.

In some embodiments, executing each sub-computation involves identifying a set of corresponding cores that together have a cache memory size that is at least the memory threshold.

BRIEF DESCRIPTION OF THE DRAWINGS

Non-limiting examples of embodiments of the disclosure are described below with reference to figures attached hereto that are listed following this paragraph. Dimensions of features shown in the figures are chosen for convenience and clarity of presentation and are not necessarily shown to scale.

The subject matter regarded as the invention is particularly pointed out and distinctly claimed in the concluding portion of the specification. The invention, however, both as to organization and method of operation, together with objects, features and advantages thereof, can be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1A:
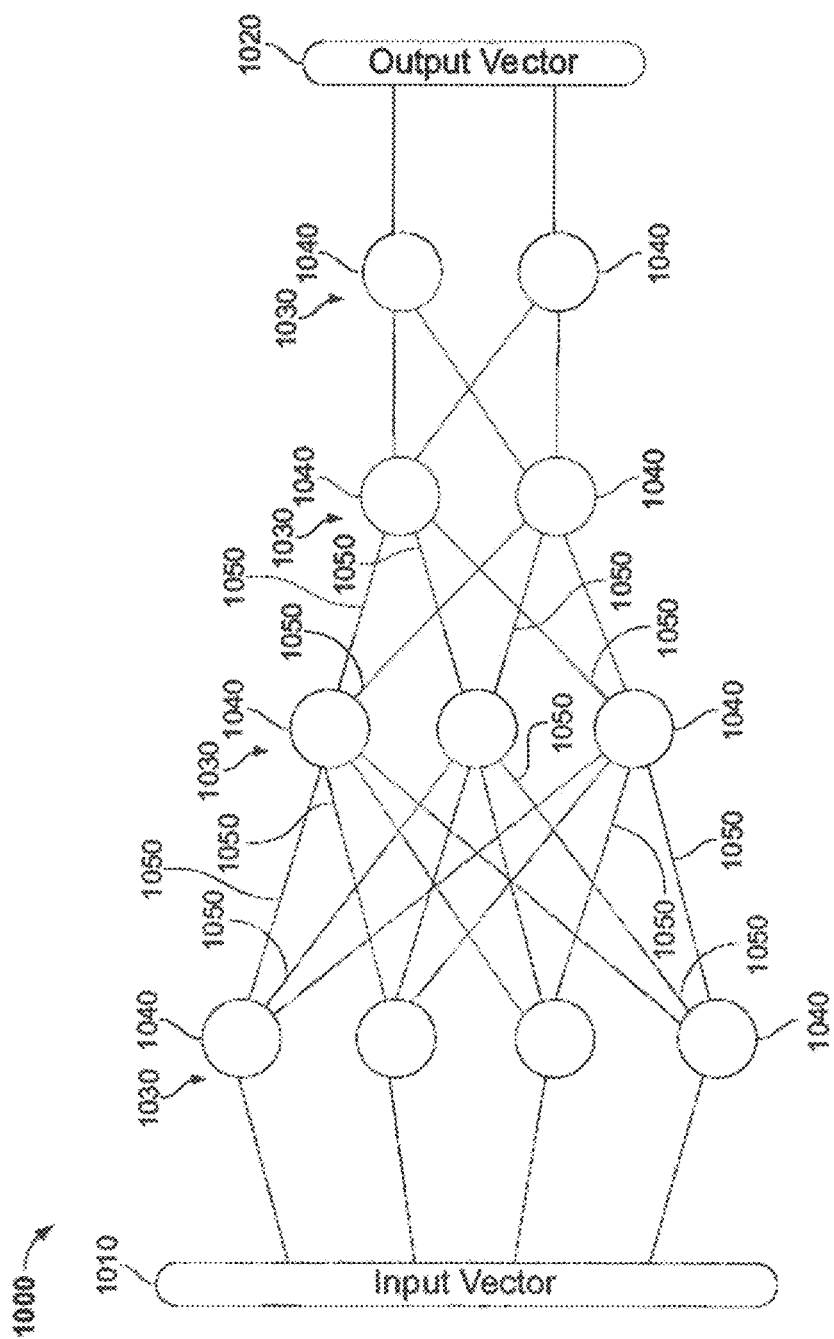
FIG. 1A is a block diagram of a neural network according to some embodiments of the invention.

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the invention can be practiced without these specific details. In other instances, well-known methods, procedures, and components, modules, units and/or circuits have not been described in detail so as not to obscure the invention.

In general, the invention involves computing outputs in a NN by executing multiple layers of the NN and/or portions of multiple layers of the NN in parallel (or substantially parallel) across multiple computing devices, where grouping of the multiple layers and/or portions of multiple layers can be based on an amount of available cache memory. The invention also generally involves reducing and/or eliminating redundant computations in the NN. Executing multiple layers of the NN and/or portions of the layers of the NN in parallel and/or reducing/eliminating redundant computations can allow for a reduction in the number of outputs during execution of intermediate layers of the NN.

For NN's implemented on GPU's, the number of outputs/computations for intermediate layers is typically not a major contributor to performance because, for example, GPU's can have high computation power (e.g., via thousands of cores) with a high memory transfer speed (e.g., 15TFlops FP32 instructions and 900 GB/s of memory bandwidth as in the Nvidia Volta architecture) such that computation values stored in memory (e.g., DRAM) can be retrieved quickly.

For NN's implemented on CPU's (e.g., multi-core CPUs), the number of outputs and/or computations for intermediate layers can be problematic because CPU's can have a low memory transfer speed (e.g., 90-250 Gb/s) such that irrespective of the computation power of the CPU, the amount of time it typically takes to transfer inputs/outputs of the intermediate layer execution to/from memory (e.g., DRAM) to be used as inputs to subsequent layers can result in the execution of NNs on CPUs being slow, such that execution of NNs on CPU's is not desired.

Although CPUs can be efficient at executing on cached data, CPUs typically slow down when data needs to be brought into the cache. For CPUs executing NNs, it can be desired to bring and/or reuse as much data as possible in order to, for example, fully utilize the large caches (e.g., on the order of 1 Mbyte L2 level cache and 30 Mbyte total of L2 and L3 on an 18 core machine) and the fast compute (e.g., 10-cycle (10 ns) L2 access latency) capabilities of the CPUs cores on cached data and/or it can also be desired to avoid bringing extra data items beyond a size of the cache because it can result in cache misses which can require a 100 cycle delay to get the data from main memory. For CPUs executing NNs, the sequential layer execution can lead to many cache misses because, for example, all or at least some of the outputs (in other words data) of each layer can be stored in memory as outputs of one layer and reread into the cache multiple times as inputs to execute on in the next layer. Reducing the number of outputs to memory and/or input operations from memory for intermediate layer execution can help avoid these expensive reads and/or writes. Thus, executing several layers fully (or almost fully) in the CPUs cache without writing them to memory can allow NN computations to be executed efficiently.

Although the paragraph above described advantages of the invention for NNs implemented on CPUs, the invention can also be applied to NN's implemented on GPUs.

Figure 1B:
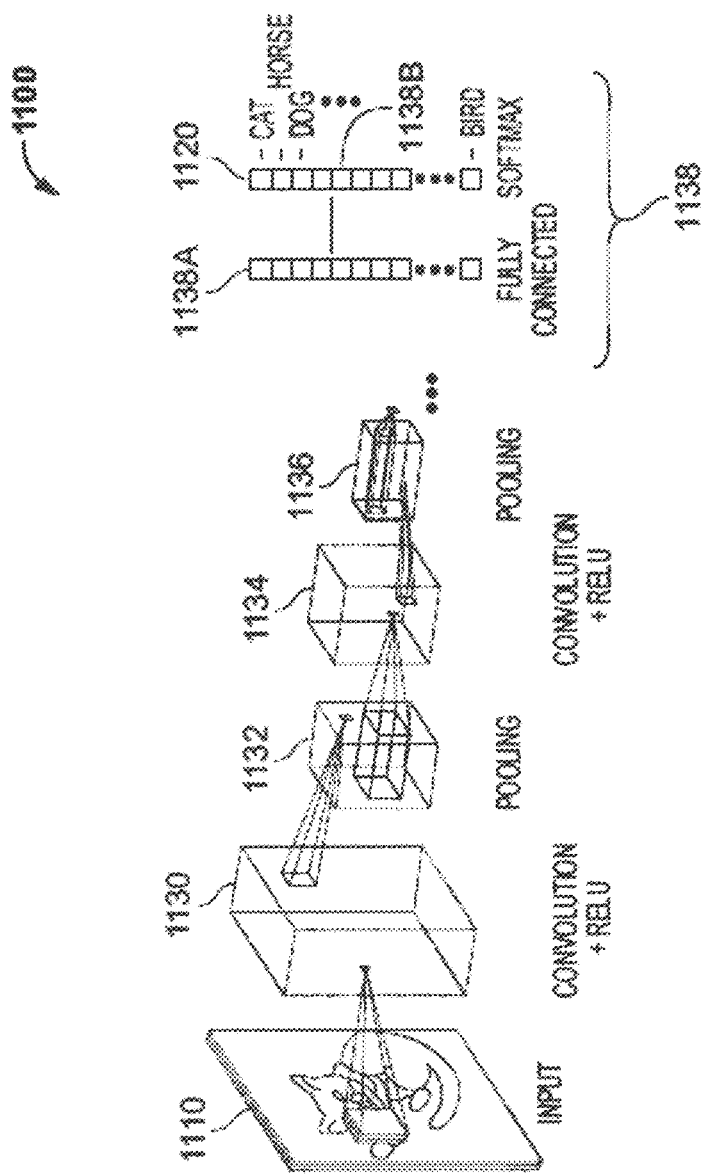
FIG. 1B is a block diagram of a neural network according to some embodiments of the invention.

FIG. 1A is a simplified block diagram of a NN according to some embodiments of the invention; in typical use thousands of neurons and links are used. NN 1000 can input data as for example an input vector 1010 of values (representing, e.g. a photograph, voice recording, or any sort of data), and can produce an output of signals or values, for example output vector 1020. NN 1000 can have neurons arranged into layers 1030, each including neurons 1040 connected to other neurons by links or edges 1050. FIG. 1B is a block diagram of a neural network according to some embodiments of the invention. NN 1100 can input data, for example image 1110 (e.g. an input vector, matrix or other data) and can produce an output of signals or values, for example output vector 1120, which can, for example, indicate the content of or a description of the image. Other input data can be analyzed. NN 1100 can in one example have layers 1130 (convolution), 1132 (pooling), 1134 (convolution), 1136 (pooling), and one or more output layers 1138, which can include for example an FC layer 1138A and a softmax layer 1138B. Each layer can include neurons connected to other neurons by links or edges. Typically, a higher or upper layer, or a layer "above" another layer, is a layer more towards the output layer, and a lower layer, preceding layer, previous layer or a layer "below" another layer, is a layer towards the input layer. The NNs in FIGS. 1A and 1B are typically simulated, and represented as data, for example in a system such as shown in FIG. 1C, below.

A convolutional layer can apply a convolution operation to its input, passing its result to the next layer. The convolution operation can for example emulate the response of an individual neuron to visual stimuli, and can, for example, include neurons processing data only for its receptive field. A convolutional layer's parameters can include a set of learnable filters (or kernels), which have a small receptive field, but extend through the full depth of the input volume. During the forward pass, each filter can be convolved across the width and height of the input volume, computing the dot product between the entries of the filter and the input and producing a 2-dimensional activation map of that filter. As a result, the NN can learn filters that activate when they detect some specific type of feature at some spatial position in the input. Stacking the activation maps for all filters along the depth dimension can form the full output volume of the convolution layer. Every entry in the output volume for a convolutional layer can thus also be interpreted as an output of a neuron that looks at a small region in the input and shares parameters with neurons in the same activation.

NNs used for classification tasks, e.g. classifying photographs into descriptions of the content, can produce, for each class i, an output $z\_i$, sometimes called a logit, which can encode or represent the likelihood that a given example input should be classified to class i. Logits $z\_i$, for each class i, (e.g., for image recognition dog, cat, llama, etc.) can be transformed into probabilities $q\_i$ by comparing each $z\_i$ to the other logits, in for example a softmax layer.

Figure 1C:
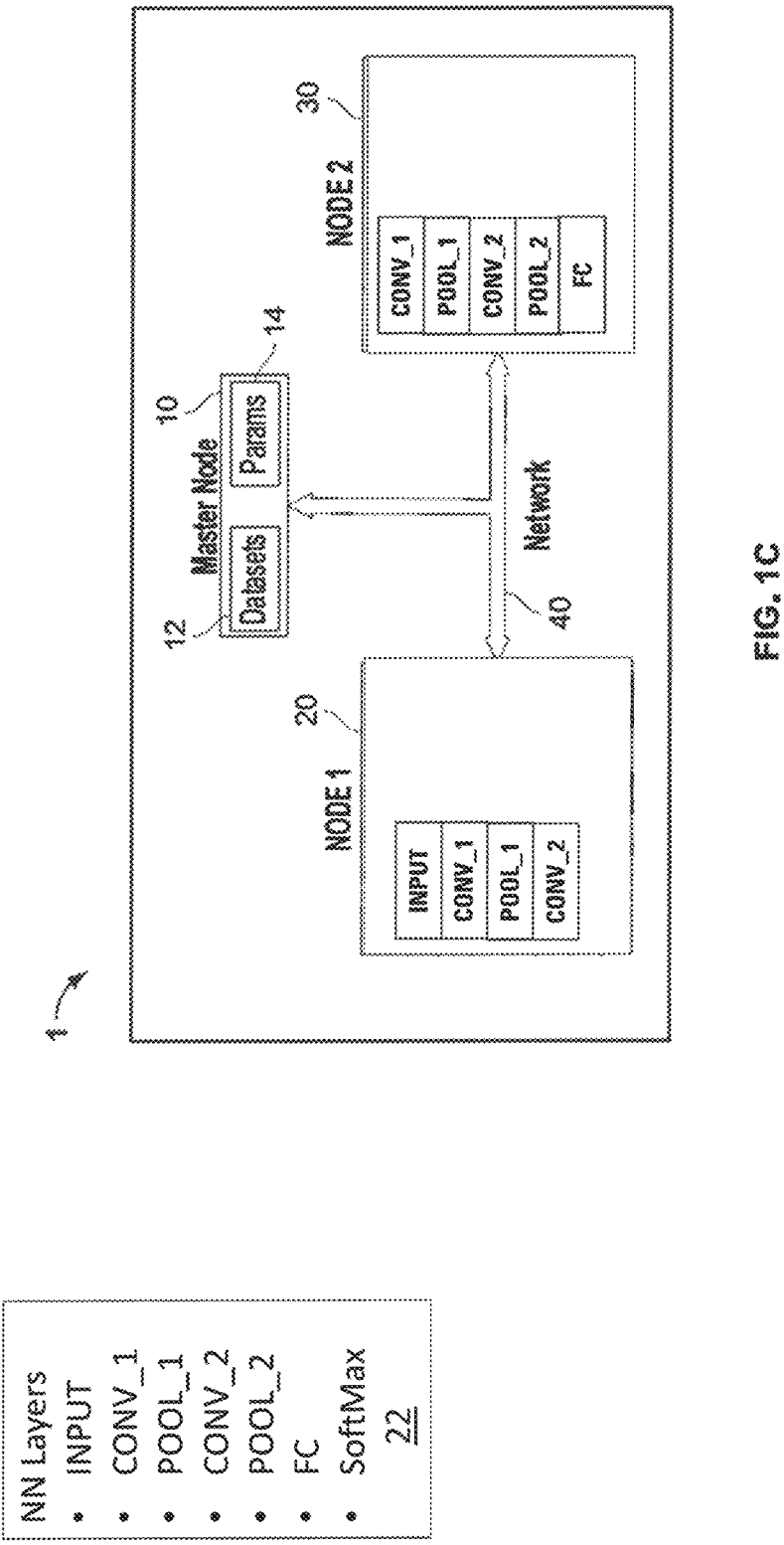
FIG. 1C is a block diagram of a system implementing a neural network according to some embodiments of the invention.

FIG. 1C is a block diagram of a system implementing a neural network according to some embodiments of the invention. Referring to FIG. 1C, a system of computing devices 1 can include computing nodes 10, 20 and 30, connected by one or more communications network(s) 40. Communications network 40 can be for example an Ethernet network, but can be one or more other communications networks. Node 10 can be a master node, distributing training data, collecting parameters and creating updated models, and nodes 20 and 30 can be training nodes, executing forward and backward passes on training data, sending parameters (e.g. weights for edges or links) to master node 10, and updating the nodes' internal representations of the NN after receiving data from the master node. In alternative embodiments, a training node (e.g. node 20 or 30) can function as a master node. In further embodiments, a fixed "master" node need not be used, and one or more training nodes can execute the functionality of a master node. Further, while only two training nodes are shown, other numbers of nodes can be used, for example 10 training nodes, 1,028 training nodes, or other numbers. Other numbers of master nodes can be used, for example an embodiment can include two master nodes and 16 training nodes, or 18 nodes total.

Master node 10 can include data 12, e.g. training sets (such as collections of images, audio files, etc.) and model data 14 representing a NN (e.g. data representing artificial neurons, links, weights, etc.) and including for example parameters such as weights, and possibly for example the arrangement of nodes, layers and edges. The NN can be for example a CNN, but can be another type of NN. For example, the NN can include layers 22 of input layer (INPUT), convolution layers (CONV_1 and CONV_2), pool layers (POOL_1 and POOL_2), a fully connected layer (FC), and a softmax layer (SoftMax).

Each of nodes 20 and 30 can execute a subset of the layers of the NN and/or a subset of computations in the subset of layers. Node 20 can include the INPUT, CONV_1, POOL_1, and CONV_2 layers. Node 30 can include the CONV_1, POOL_1, CONV_2, POOL_2, and FC layers. Each of nodes 20 and 30 can include neurons, links, weights, etc. that are a subset of the datasets of the master node 10 corresponding to the respective subset of the layers of the NN and/or a subset of computations in the subset of layers.

In various embodiments, node 20 and/or node 30 include between one and all of the layers of the NN. Other numbers and types of layers can be used.

Nodes can be for example CPU based systems (e.g. workstations, PCs), GPU based systems, or other systems. In one example embodiment, master node 10 is a CPU based system and training nodes can be other systems such as GPU based systems. Nodes 10, 20 and 30 can be or include structures such as those shown in FIG. 2. While in some embodiments a generic CPU (e.g. a workstation, a PC (personal computer), a multi-core system) is discussed as a node, embodiments of the invention can be used with other types of nodes, such as GPUs. Further, while example embodiments of the invention discuss a relatively simple, slow communications connection between nodes, such as an Ethernet, other networks or communications systems, such as relatively fast, expensive, and specially made systems, can be used.

Figure 2:
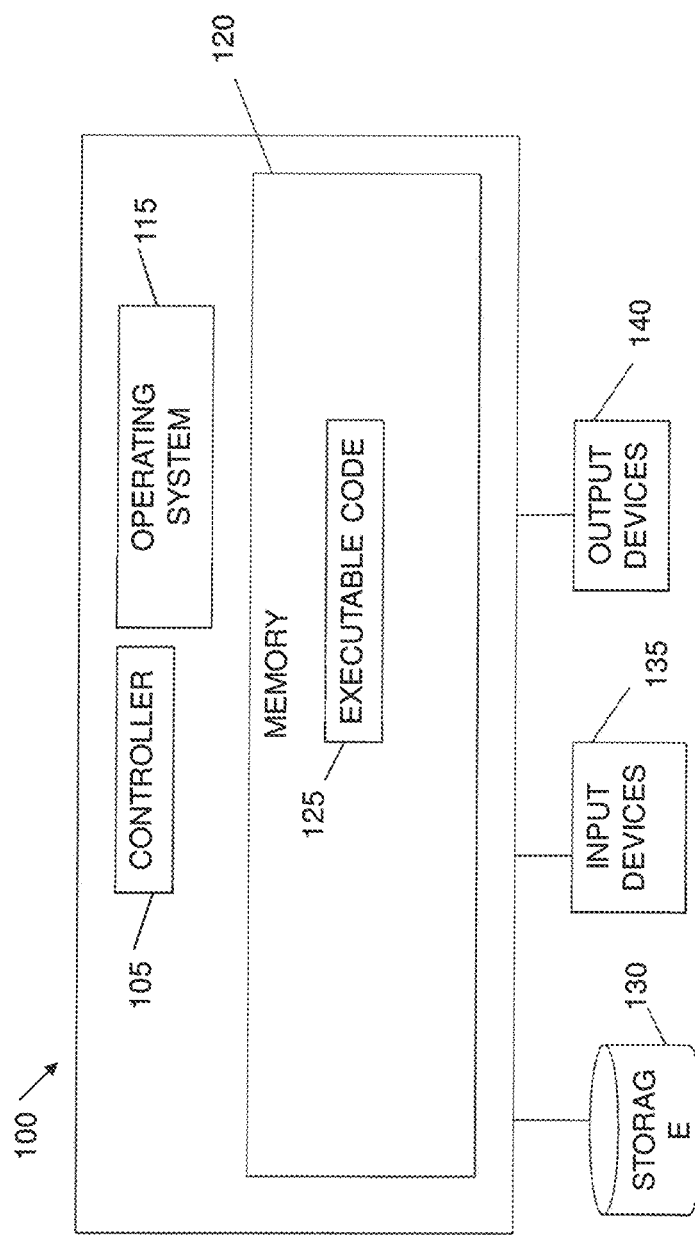
FIG. 2 is a high-level block diagram of an exemplary computing device which can be used with embodiments of the invention.

FIG. 2 shows a high-level block diagram of an exemplary computing device 100 which can be used with embodiments of the invention. Computing device 100 can include a controller or processor 105 that can be or include, for example, one or more central processing unit processor(s) (CPU), one or more Graphics Processing Unit(s) (GPU or GPGPU), a chip or any suitable computing or computational device, an operating system 115, a memory 120, a storage 130, input devices 135 and output devices 140. Each of modules and equipment such as nodes 10, 20 and 30, and other equipment mentioned herein can be or include a computing device such as included in FIG. 2, although various units among these entities can be combined into one computing device.

Operating system 115 can be or can include any code segment designed and/or configured to perform tasks involving coordination, scheduling, arbitration, supervising, controlling or otherwise managing operation of computing device 100, for example, scheduling execution of programs. Memory 120 can be or can include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 can be or can include a plurality of, possibly different memory units. Memory 120 can store for example, instructions to carry out a method (e.g. code 125), and/or data such as user responses, interruptions, etc.

Executable code 125 can be any executable code, e.g., an application, a program, a process, task or script. Executable code 125 can be executed by controller 105 possibly under control of operating system 115. For example, executable code 125 can when executed cause NN training, coordination of NN training tasks, NN execution or inference, etc. according to embodiments of the invention. In some embodiments, more than one computing device 100 or components of device 100 can be used for multiple functions described herein. For the various modules and functions described herein, one or more computing devices 100 or components of computing device 100 can be used. Devices that include components similar or different to those included in computing device 100 can be used, and can be connected to a network and used as a system. One or more processor(s) 105 can be configured to carry out embodiments of the invention by for example executing software or code. Storage 130 can be or can include, for example, a hard disk drive, a floppy disk drive, a Compact Disk (CD) drive, a CD-Recordable (CD-R) drive, a universal serial bus (USB) device or other suitable removable and/or fixed storage unit. Data such as instructions, code, NN model data, parameters, etc. can be stored in a storage 130 and can be loaded from storage 130 into a memory 120 where it can be processed by controller 105. In some embodiments, some of the components shown in FIG. 2 can be omitted.

Input devices 135 can be or can include for example a mouse, a keyboard, a touch screen or pad or any suitable input device. It will be recognized that any suitable number of input devices can be operatively connected to computing device 100 as shown by block 135. Output devices 140 can include one or more displays, speakers and/or any other suitable output devices. It will be recognized that any suitable number of output devices can be operatively connected to computing device 100 as shown by block 140. Any applicable input/output (I/O) devices can be connected to computing device 100, for example, a wired or wireless network interface card (NIC), a modem, printer or facsimile machine, a universal serial bus (USB) device or external hard drive can be included in input devices 135 and/or output devices 140.

Embodiments of the invention can include one or more article(s) (e.g. memory 120 or storage 130) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

Figure 3:
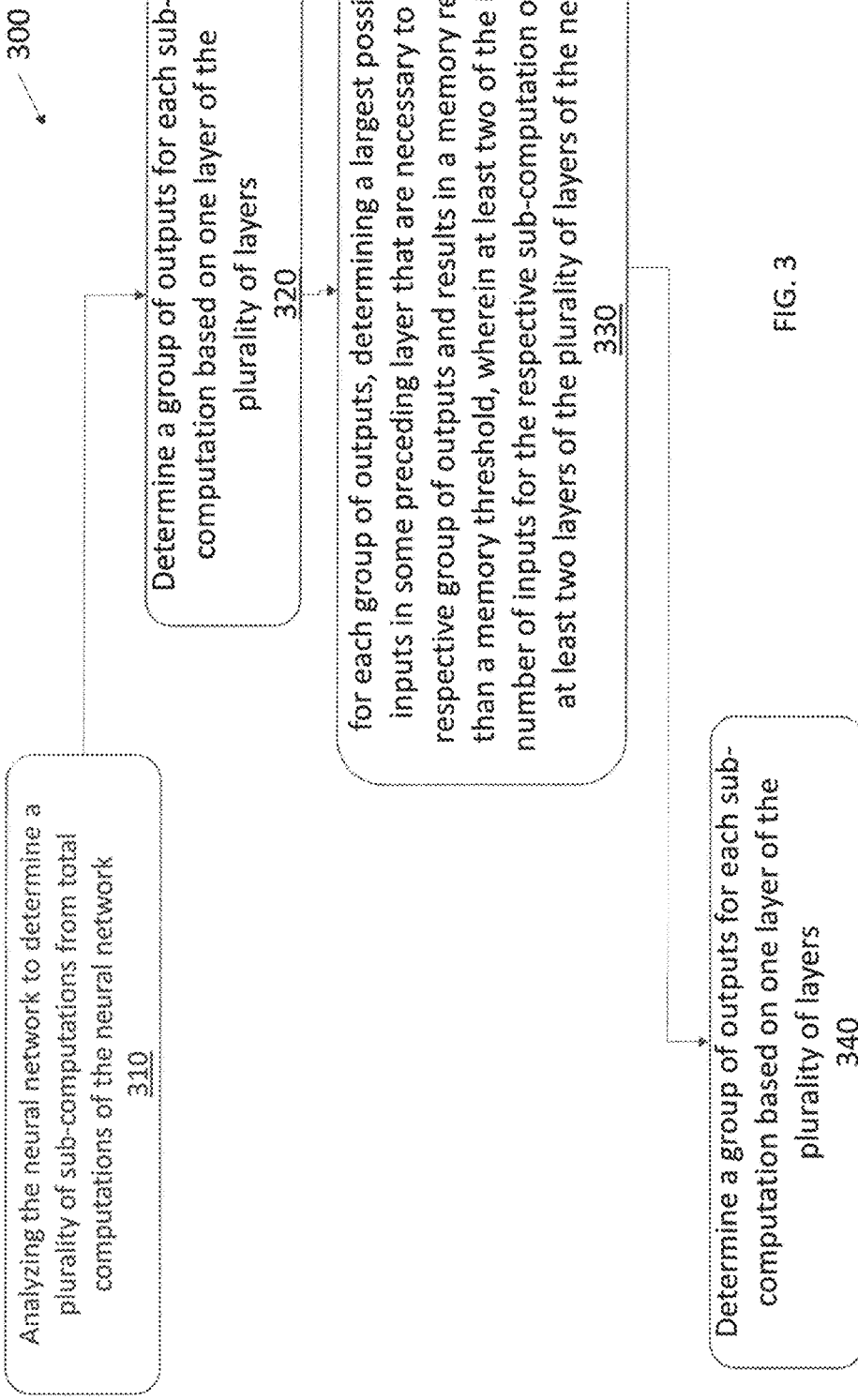
FIG. 3 is a flow chart for a method for computing one or more outputs of a neural network having a plurality of layers according to some embodiments of the invention.

FIG. 3 is a flow chart for a method 300 for computing one or more outputs of a neural network (e.g., NN as described above in FIGS. 1A, 1B and 1C) having a plurality of layers (e.g., layers 22 as described above in FIG. 1C), according to some embodiments of the invention.

The method can involve analyzing, by a computing device (e.g., the computing device 100 as described above in FIG. 2), the neural network to determine a plurality of sub-computations from total computations of the neural network (Step 310). The plurality of sub-computations can include the total computations of the neural network.

The plurality of sub-computations can span more than one layer of the network and/or include a portion of the computations associated with each layer.

Determining each sub-computation can include determining a group of outputs for each sub-computation based on one layer of the plurality of layers (Step 320). The one layer can be a starting layer for the sub-computations. The one layer can be any layer in the plurality of layers.

Determining each sub-computation can also include for each group of outputs, determining a largest number of inputs in some layer that precedes the one layer that are necessary to compute the respective group of outputs and results in a memory requirement less than a memory threshold (Step 330). The at least two of the largest number of inputs for the respective sub-computation can overlap and/or span at least two layers of the plurality of layers of the neural network.

In some embodiments, determining the group of outputs for each sub-computation, and determining each of the sub-computations involves:

a. Set the group of outputs to an empty set { } and receiving a bottom layer (e.g., a layer in the NN that is a lowest priority layer to descend to when traversing the layers from a start layer, where the start layer is the highest priority layer any output is in). In some embodiments, the bottom layer is input by a user. In some embodiments, the bottom layer is determined based on a desired depth within the neural network for each sub-computation. In some embodiments, the bottom layer is determined based on a desired width within the neural network for each sub-computation. In some embodiments, the start layer is an input layer of the NN. In some embodiments, for a NN having a convolution layer with a Winograd transform, the start layer is the layer after the Winograd transform layer and before the internal matrix multiple. In some embodiments, for a NN having a convolution layer with a Fast-Fourier Transform (PP 1), the start layer is the layer after the FFT transform layer and before the internal matrix multiple. In some embodiments, the start layer is the layer that ensures no more than the convolutional layers are descended through (e.g., in ResNet the bottom layer is the layer that is four convolutions deep). In some embodiments, the start layer is a pooling layer. In some embodiments, the start layer is input by the user.

b. Add an output that has not been previously added (e.g., a new output (y)) from the current layer to the group of outputs, wherein the current layer is a layer that has not had its outputs added. The new output (y) can be selected from all output in the layer that have not been previously added based on a predefined order. The predefined order can be based on a random number generator, input by a user or any combination thereof;

c. Add all outputs in each layer of the NN from the current layer traversing to the bottom layer that contribute to computing new output (y) into the group of outputs;

d. If an amount of memory required to store the group of outputs is greater than the memory threshold, then:

i. If the group of outputs is only the new output (y), then reset the layer before the bottom layer to be the bottom layer and repeat from step a.

ii. Otherwise, the current sub-computation is all of the computations in the NN that contribute to determining the group of outputs e. Otherwise, the amount of memory required for the group of outputs is not greater than the memory threshold. If there are outputs in the current layer that have not been the basis of any of the plurality of sub-computations, return to step a.

In various embodiments, the memory threshold is based on an aggregate amount of cache of one or more computing devices (e.g., one or more cores) that execute the respective sub-computation.

The method can also involve computing the outputs of the neural network by executing each sub-computation (Step 340). In various embodiments, one or more nodes (e.g., one or more CPUs) are assigned to each of the sub-computations. In various embodiments, the one or more nodes are chosen to minimize an amount of data transferred into/out of memory during execution of the respective sub-computations. In some embodiments, the one or more nodes are chosen such that inputs/outputs (e.g., NN data) can be repeatedly swapped from the same regions of the cache. For example, assume there are two consecutive computation, first and second computations, within a particular sub-computation, then the execution starts with the first computations input that is stored in a first cache location and generates the first computations output and stores it in second cache location. Next, the second computation uses the cache location of the first computations input as the cache location for the second computations output, such that the cache memory is reused between the computations within a particular sub-computation. In these embodiments, the cache size needed for a particular sub-computation can be the maximum of the sums of inputs and outputs across all the sub-computations computations.

In some embodiments, the execution occurs in the respective L2 cache.

In some embodiments, at the beginning of a sub-computation, inputs are read from DRAM memory and outputs of the sub-computation are written into DRAM once the entire sub-computation executes.

In various embodiments, the NN can be executed in inference mode (e.g., forward execution through the NN) or training mode (e.g., backward execution through the NN). In training mode, it can be desired to store results of the NN execution in main memory. In these embodiments, the sub-computations can be executed as described above and written from cache into the main memory.

Swapping the NN data into and out of the same regions of the cache can allow for the one or more nodes to be compute bound rather then memory bound, for example, as may be desired for execution the NN on CPUs.

In some embodiments, computing the outputs of the neural network involves scheduling an order of execution for each of the sub-computations. In various embodiments, the order of execution is based on a work-stealing scheduler, a static compile time pre-scheduler, or any combination thereof. In some embodiments, the order of execution is such that the computations occur in a distributed asynchronous order that is not necessarily the order of the layers of the neural network.

In some embodiments, the order of execution (e.g., a schedule) is dynamically determined by a scheduler during execution. The dynamic scheduler can schedule based on a computation specific pattern, for example, scheduling to execute sub-computations that are close to one another but do not overlap. In some embodiments, the dynamic scheduler can include a machine learning algorithm to learn the regions of the NN that have high compute, such that the dynamic scheduler can schedule based on the learning. In these embodiments, a single large shared CNN graph stored in a memory can be computed by automatically distributing the computations among the cores/threads by the scheduler.

In some embodiments, the order of execution is dynamically determined by a scheduler during execution based on a particular neural network type (e.g., CNN, recurrent neural network, modular neural network, and/or other neural network types as are known in the art.) In some embodiments, the order of execution is dynamically by a scheduler during execution based on input type.

Figure 4:
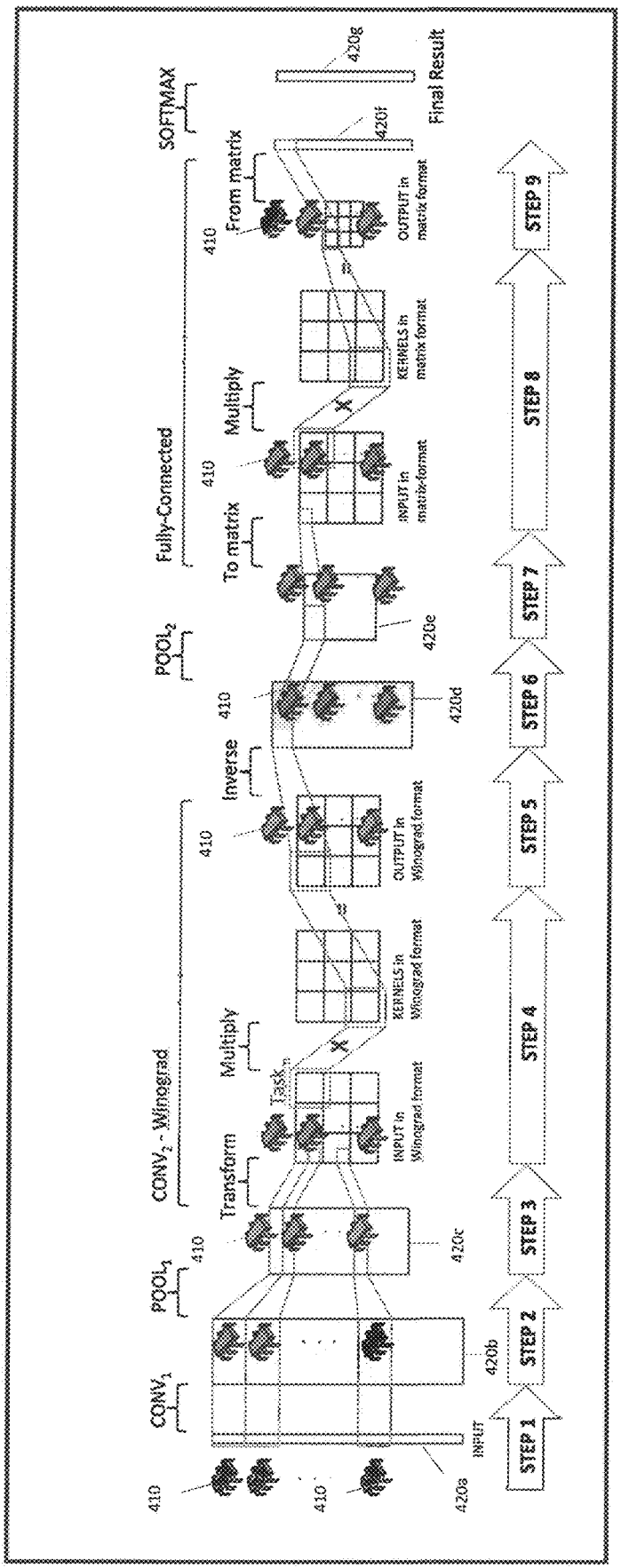
FIG. 4 is a simplified schematic diagram of a CNN having sequential layer execution, according to an example of the prior art.
Figure 5:
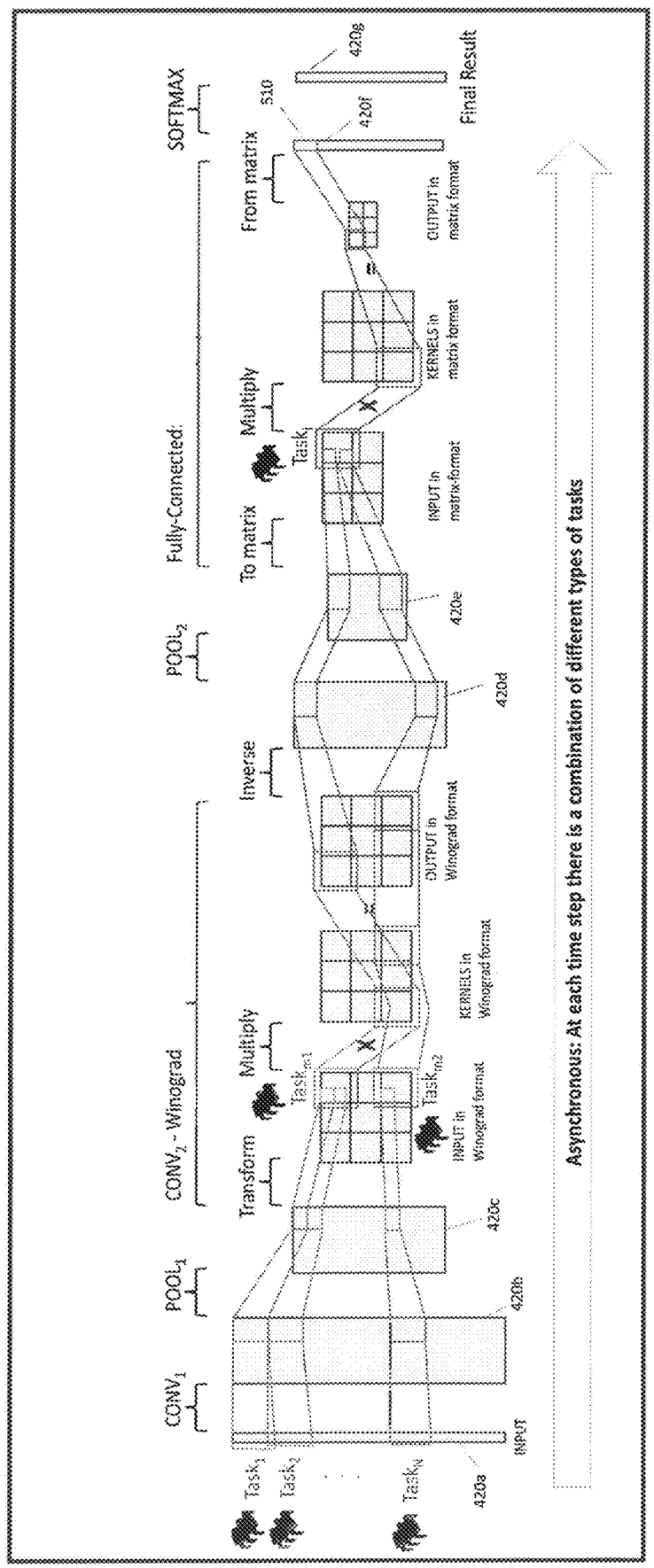
FIG. 5 is a simplified schematic diagram of the CNN of FIG. 4 having a plurality of sub-computations spanning more than one layer of the CNN, according to some embodiments of the invention.

FIG. 4 is a simplified schematic diagram of a CNN having sequential layer execution, according to an example of the prior art. FIG. 5 is a simplified schematic diagram of the CNN of FIG. 4 having a plurality of sub-computations spanning more than one layer of the CNN, according to some embodiments of the invention.

Viewing FIG. 4, the CNN is an example of a convolutional neural network having the following layers: Conv1, Pool1, Conv2, Pool2, Fully-Connected and Softmax. Each layer can require one or more cores 410 to compute the respective layer and one or more buffers 420a, 420b, 420c, 420d, 420e, 420f, and 420g to store results and/or intermediate computation results of the respective layers.

During execution, the Conv1 layer is executed by multiple threads/nodes at the same time having inputs from the input buffer 420, and outputs of the Conv1 layer are written to the next buffer 420b. After all of the outputs of the cony layer are written by the threads, are the outputs of the Conv1 layer are read from the buffer 420b as input to the Pool1 layer. The figure does not show the execution of all the threads but only highlights some of them so as to not clutter the figure. It is to be understood that all the threads complete one layer before moving on to the next layer. After the Conv1 layer is completed and its outputs are all written, the Pool1 layer is executed and its outputs are written to the next buffer 420c. The outputs of the Pool1 layer are read from the buffer 420c as input to the CONV2 layer. Within the CONV2 layer the inputs are transformed into a Winograd format and multiplied by the kernels, to produce output in the Winograd format. The output is inversed and written to the buffer 420d as the overall output of the CONV2 layer. The output of the CONV2 layer is read from the buffer 420d as input to the Pool2 layer. The Pool2 layer is executed and its outputs are written to the buffer 420e. The outputs of the Pool2 layer are read from the buffer 420e as input to the Fully-Connected layer. The inputs are transformed to a matrix format and multiplied by kernals to produce an output of the Fully-Connected layer that is written to the buffer 420f. The output of the Fully-Connected layer is read from the buffer 420f as input to the Softmax layer. The Softmax layer is executed and the outputs are written into the final result buffer 420g. In this sequential manner the CNN of FIG. 4 is executed.

FIG. 5 is a simplified schematic diagram of the CNN of FIG. 4 having a plurality of sub-computations (e.g., tasks)

spanning more than one layer of a CNN, according to some embodiments of the invention. Although the layers of FIG. 5 are the same layers as FIG. 4, it can be seen in FIG. 5 that there are plurality of sub-computations, $Task_1$, $Task_2$, ... $Task_N$, $Task_{m1}$, $Task_{m2}$, $Task_i$, that span across multiple layers. During execution, $Task_1$, $Task_2$, ... $Task_N$ can be executed in parallel or asynchronously. $Task_{m1}$ can execute as soon as $Task_1$, $Task_2$ output is ready. $Task_{m2}$ can be executed as soon as $Task_N$ output is ready. $Task_{m1}$, $Task_{m2}$ can execute at different times. In this manner, execution of the CNN layer by layer can be avoided.

The plurality of sub-computations $Task_1$, $Task_2$, ... $Task_N$, $Task_{m1}$, $Task_{m2}$, $Task_i$ can be determined prior to execution. The plurality of sub-computations can be determined recursively moving back from a portion of the Softmax layer output 510 and aggregating the sub-computations that are required to produce the Softmax layer output 510. As can be seen in FIG. 5, $Task_i$ traverses back and aggregates all outputs/computations from Softmax layer output 510, through Fully-Connected reshuffle layer and a stops in the Fully-Connected matrix multiply, which indicates that in this example the Fully Connected matrix multiply layer is when the outputs reach a memory size that reaches a memory threshold. All of the outputs/computations needed to create the inputs for $Task_i$, which are the outputs of $Task_{m1}$, $Task_{m2}$ are considered. $Task_{m1}$, $Task_{m2}$ each traverses back and aggregate all outputs/computations from Fully-Connected re-shuffle, pooling, and some of the layers of a Winograd transform convolutional computation without the Winograd initial transform, which indicates that in this example these Winograd transform convolution layers is when the outputs reach a memory size that reaches the memory threshold. All of the outputs/computations needed to create the inputs for $Task_{m1}$, $Task_{m2}$, which are the outputs of $Task_1$, $Task_2$, ... $Task_N$ are considered. $Task_1$, $Task_2$, ... $Task_N$ each traverse back and aggregate all outputs/computations from a portion of the transform, pooling, and direct convolution layers, which indicates that the memory threshold has not been met and all computations from all layers have been added to the sub-computations. In this example, the sub-computation generation (e.g., task generation) splits the Winograd computation across two sub-computations.

In some embodiments, the number of computations in the neural network can be reduced. In some sub-computations, a computation may be repeated. For example, sub-computations that include convolutional layer operations can require the same computation be performed multiple times. In another example, for a given layer in a NN there can be overlaps in input sets of neighbors, that is tasks that handle proximate parts of the input. For example, for a NN that processes a part of an image, these computations can have neighboring pixels in the image. If the image is one dimensional, then each computation can have two neighbors that share inputs with it. If the image is two dimensional, then each computation can have eight neighbors, four of the shared regions can be shared with neighbors in a pairwise manner, and four can be shared with three other neighbors. The one computation shared between a pair can repeat only once, but the one computations shared with three other neighbors can be recomputed three additional times.

Figure 6:
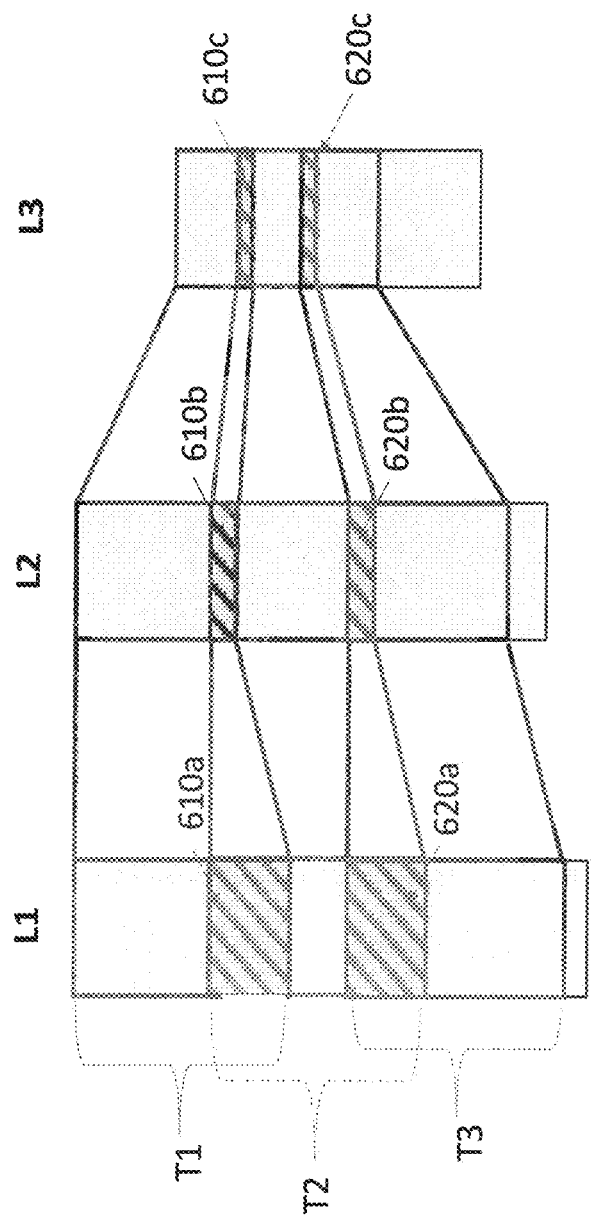
FIG. 6 is a simplified schematic diagram of a one-dimensional neural network having three layers and three sub-computations, according to some embodiments of the invention.

FIG. 6 is a simplified schematic diagram of a one-dimensional neural network having three layers, L1, L2, L3, and three sub-computations, T1, T2, and T3, according to some embodiments of the invention. As can be seen in FIGS. 6, T1 and T2 have overlapping regions 610a, 610b, and 610c in L1, L2, and L3, respectively, and T2 and T3 have overlapping regions 620a, 620b, and 620c, in L1, L2 and L3, respectively. If T1 and T3 complete their computations prior to the execution of T2, then the T2 can use the overlap regions results without having to recompute the values in the overlap regions.

Figure 7:
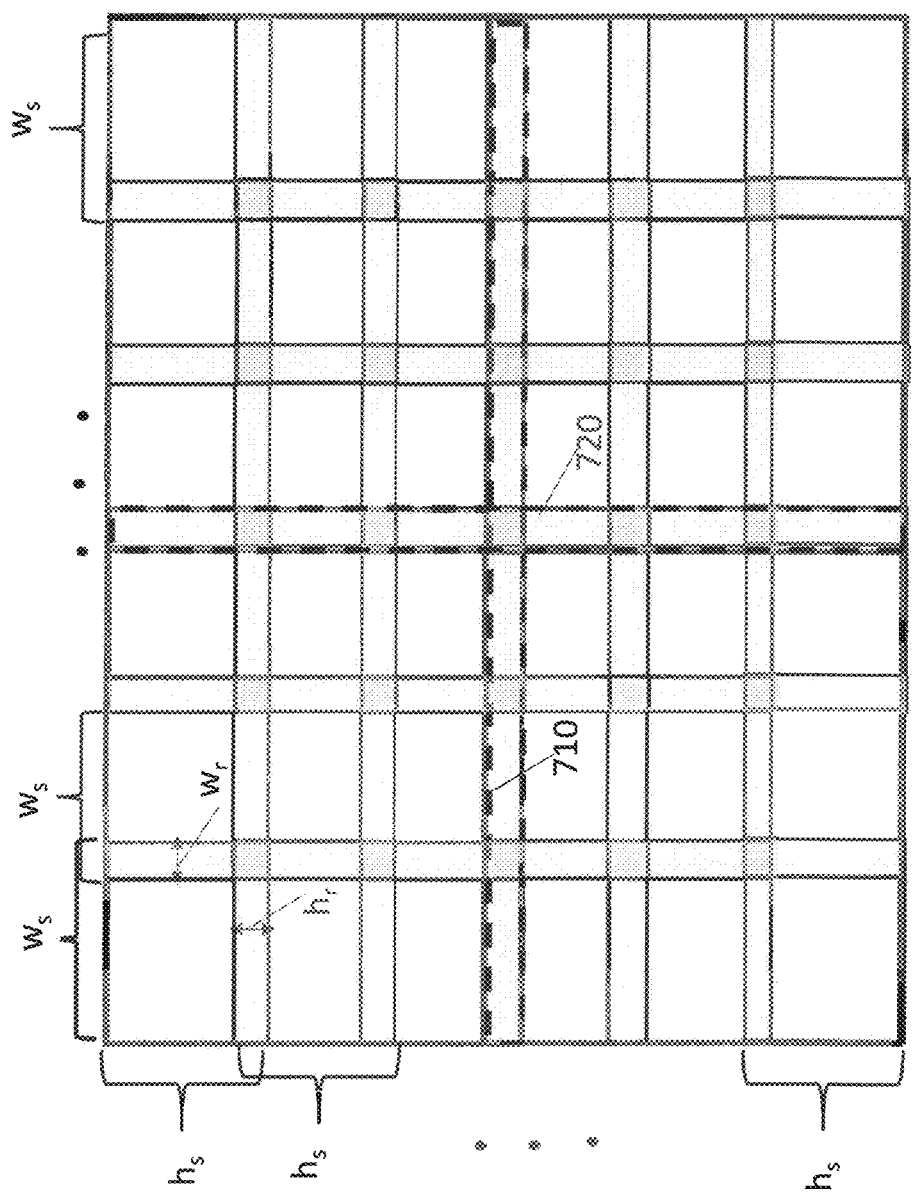
FIG. 7 is a simplified schematic diagram of a two-dimensional neural network layer having overlaps, according to some embodiments of the invention.

FIG. 7 is a simplified schematic diagram of a two-dimensional neural network layer having overlaps, according to an illustrative embodiment of the invention. In FIG. 7 there are 6×6 sub-computations for the layer. Each sub-computation in the layer has a width ($w_s$) and a height ($h_s$), where $w_s$ and $h_s$ are equal for all sub-computations. Each sub-computation has an overlap region that has a width ($w_r$) and a height ($h_r$), where $w_r$ and $h_r$ are equal for all sub-computations in the layer. In some embodiments, $w_r$ and $h_r$ are not equal. As described above, it can be desirable to minimize the amount of computations. In some embodiments, minimizing the amount of computations can involve avoiding recomputing the overlap regions. In some embodiments, avoiding recomputing the overlap regions can require more computations than recalculating the overlap region. Whether or not avoiding computation of overlap regions results in more or less computations can be evaluated based on a recompute ratio.

The recompute ratio can be determined based on comparing a total number of computations for a given layer with total number of computations for an overlap region for a given layer. The total number of computations for a given layer ($T_c$) can be determined as follows:

$$T_c = n^2 w_s^2 - 3n^2 - w_r^2 - n^2 w_r(w_s - 2w_r) \quad \text{Equation 1}$$

where n is the number of sub-computations in the layer, $w_s$ is the width of the sub-computations, and $w_r$ is width of the overlap regions. The total number of computations for an overlap region for a given layer ($O_c$) can be determined as follows:

$$O_c = 3n2wr2 + n^2 w_r(w_s - 2w_r) \quad \text{Equation 2}$$

The recompute ratio (R) can be determined as follows:

$$R = O_c/T_c \quad \text{Equation 3}$$

For example, independent of n, for $w_s=40$ and $w_r=2$, then R=5%; for $w_s=40$ and $w_r=5$, then R=16%; for $w_s=40$ and $w_r=10$, then R=45%. As can be seen, when R is low, the effect of recomputing the overlap regions can be negligible. As the ratio increases, in other words as the overlap region gets larger, recomputing the overlap regions can become computationally intensive.

In some embodiments, the sub-computations for a given layer can be further divided into one or more workspaces. The one or more workspaces can be computed in parallel by a set of cores that execute asynchronously. Dividing the sub-computations into one or more workspaces can allow for avoiding recompute only to be done on the overlap regions that are involved in sub-computations that are within in a given workspace, and ignoring the overlap regions between the workspaces. In some embodiments, the one or more workspaces are selected to minimize the value of the recompute ratio. For example, turning to FIG. 7, the 6×6 sub-computations in the layer can be broken up into 4 workspaces, where each workspace includes 9 sub-computations and the 4 workspaces include overlap regions 710 and 720, where the overlap regions 710 and 720 are recomputed.

In some embodiments, avoiding overlapping region computations involves using a buffer array to store the overlapping regions for each sub-computation and a hash table to store start points of the overlap regions in the buffer array. The buffer array can be indexed by a shared fetch-and-add counter (e.g., a current_free_space_counter) that points to a next location for an overlapped region to be placed in a shared main memory. The counter can be incremented by a size of the overlapped region each time a stream of an overlapping region is performed by a core. The index into the buffer (e.g., a pointer) can be stored in a hash table using, for example, for an input of an image, pixel coordinates of the overlap region as keys to the table. For non-image inputs other indexing approaches can be used, as is apparent to one of ordinary skill in the art. For example, for a one-dimensional image, the x-coordinates of the leftmost pixel in the overlap region can be used. In another example, for two-dimensions, the x-y-coordinates of the upper lefthand pixel can be used. Each entry of the hash table can contain a ready flag. The ready flag can be set by the core computing and indicate when the stream has started, when the stream has completed and when the values of the overlap region can be read and used. The scheduler (e.g., as describe above) that sets the computation order can use the ready flag for synchronization.

In some embodiments, avoiding the overlapping region computations can involve a core executing the following method for each computation of each sub-execution that can synchronize using a Compare and Swap (CAS) and Fetch and Add (F&A):

1.    Ret = CAS(hash_table(key_hash(x-y-coordinates of region)).ready_flag, empty, streaming). // acquire table slot
2.    If Ret == empty // success
  a.   Index = F&A(current_free_space_counter, overlap-region-length) // allocate memory
  b.   hash_table(key_hash(x-y-coordinates of region)).Index = Index // store index
  c.   Stream overlap region to buffer starting at location Index // Stream
  d.   Ready_flag = streaming_done // Notify done streaming
3.    While ready_flag <> streaming_done goto 3 // wait for streaming to end
4.    Prefetch starting from location hash_table(key_hash(x-y-coordinates of region)).Index // overlap computed already - get it The method can involve in Step 1, locking a hash table entry. The function key_hash can returns the appropriate entry. Ret contains a flag value seen, so Ret==empty can mean that the flag was successfully atomically set by each computation in the sub-computation (e.g., thread) from "empty" to "streaming," so it is responsible for computing this region, and the flag prevents any other thread from writing or computing it.

The method can involve in Step 2, the successful thread allocates (Step 2a) space to write to results of the computation by incrementing an index that allocates the appropriate area of length x by y in the buffer array. This can be achieved by an atomic F&A instruction to prevent another concurrent thread from allocating the same buffer array slots to another region. In Step 2b, the thread stores the computed index into the table slot. Step 2c computes and streams the computation results into the allocated buffer array region. Step 2d involves releasing the lock on the region once the streaming is done.

The method can involve Step 3, a thread waits if the results of a region are being written. If this is the thread that was responsible for writing the results the method moves successfully to Step 4, otherwise the thread is stalled until the results are written.

The method can involve Step 4, the results are read from the buffer array and returned, whether by the original computing thread or any other thread needing these results.

In some embodiments, the buffer array can be sized such that it is located in a shared L3 on Intel Processors.

This method can allow a thread to either prefetch an already computed value for an overlapping region or compute and stream it for other sub-computations to use. Note that cores (and the threads that run on them) can be completely asynchronous and/or use synchronization operations to coordinate. In this manner, overlap between different cores can be reused due to, for example, an ability to create shared memory synchronization among CPU cores and/or access by multiple computing cores.

During execution, the scheduler can attempt to run the threads the moment their inputs are ready, with the computation of overlapping threads continuing despite the overlap. The data structure can be initialized per workspace and once the sub-computations of a workspace are complete the structure can be reset and the next workspace can reuse it. In various embodiments, a simple barrier or termination detection algorithm is used on work stealing queues of the scheduler to detect when a workspace is complete.

The threads/cores may not need to wait for the workspace to complete and/or can move on asynchronously to compute in the next workspace. The completion detection is typically for the purposes of memory reuse so that the overall memory used for computing can remains low.

In some embodiments, the overlap regions between the workspaces can be computed only once.

As described above with respect to FIG. 3, in some embodiments, the sub-computations can be assigned an order to execute in, and/or a particular core to execute on. In some embodiments, the order to execute sub-computations in can be based on the overlap regions. For example, in FIG. 6, it can be seen that if T1 and T3 have already completed their computation, then T2 can use the computed values for the overlapping input regions without having to recompute them. Thus, it can be desirable to schedule the T1 and T3 to be executed in parallel and T2 to execute once they are done. The order to execute sub-computations can be set such that proximate sub-computations that are not immediate neighbors execute first, so that, for example, the T1 and T3 rather than T1 and T2 or T2 and T3.

In some embodiments, having a work stealing scheduler and the CAS/F&A method described above, if neighboring tasks T1 and T2 happen to be scheduled concurrently, the synchronization on the ready_flag in step 3 can allow them a concurrent execution in which both can proceed in parallel without any problem. In the example, T2 will wait on the ready_flag of the overlap regions of T1 and T3 in the hash table, such that an asynchronous execution of the sub-computations can occur.

Figure 8:
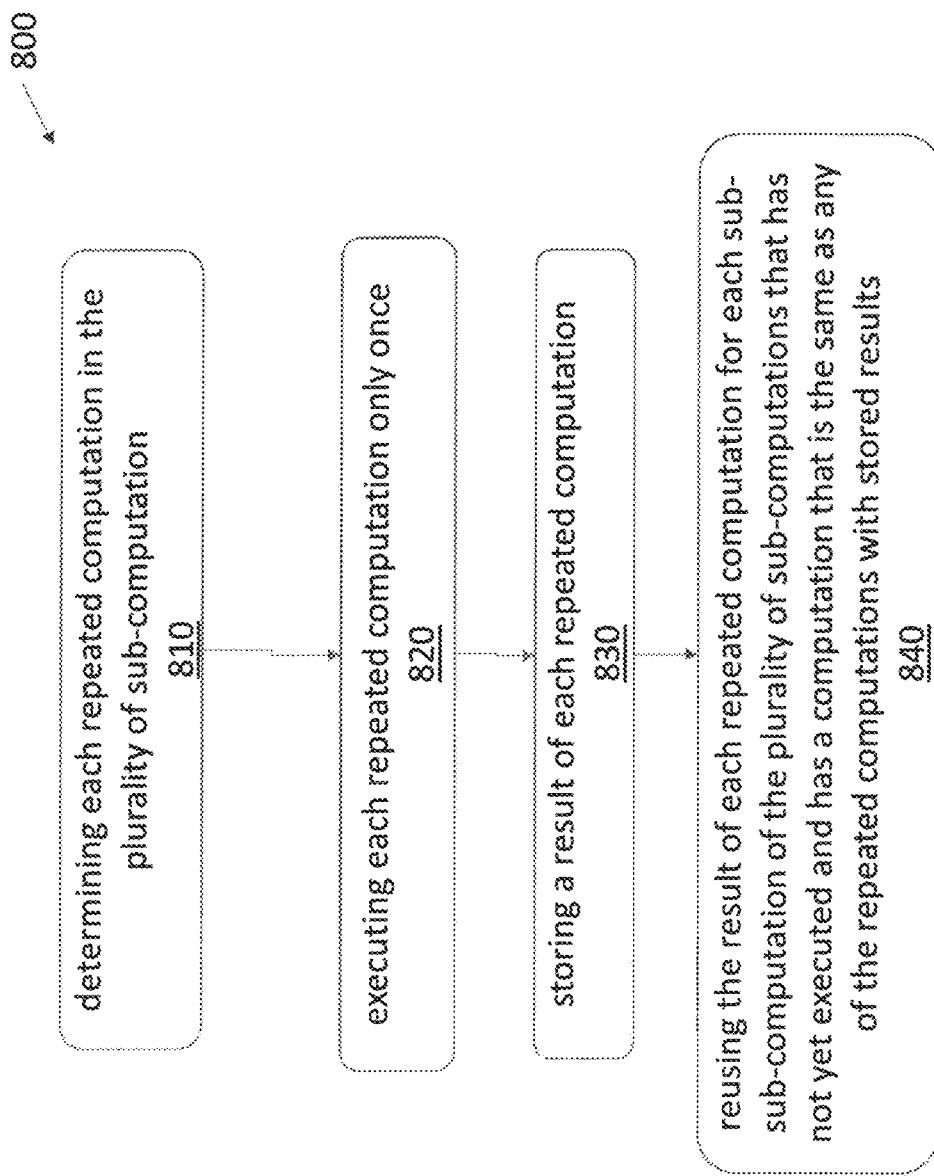
FIG. 8 is a flow chart for a method for reducing computations, according to some embodiments of the invention.

In some embodiments, the computations that are repeated can be executed only once and the results can be stored in the cache and accesses each time the result of that particular repeat computation is needed. For example, turning to FIG. 8, FIG. 8 is a flow chart for a method 800 for reducing computations, according to some embodiments of the invention. The method involves determining each repeated computation in the plurality of sub-computations (Step 810). The repeated computations can be determined based on identifying an overlap region, as described above with respect to FIG. 7. Overlap regions can be determined statically based on the network structure by looking at the input ranges of the various input neurons to the bottom layer of a task.

The method also involves executing each repeated computation only once (Step 820). Executing reach repeated computation only once can involve determining whether the overlap region has been executed already or not (e.g., as described above, checking the ready flag in a buffer location assigned to the particular region).

The method also involves storing a result of each repeated computation (Step 830). Storing a result of each repeated computation can involve storing overlap region computations in a buffer, as described above.

The method also involves reusing the result of each repeated computation for each sub-computation of the plurality of sub-computations that has not yet executed and has a computation that is the same as any of the repeated computations with stored results (Step 840).

In various embodiments, for an input batch with N inputs, the method can include transmitting each input one at a time when executing on a CPU. In these embodiments, a further cache memory savings can be realized. For example, considering the NN in FIG. 5, for an input batch of N=256, 3027 times less memory can be used.

For a CNN, the memory needed can depend on an output size of Pool2 layer, which for example, can typically be 3.25 MB. However, the memory required for the Pool2 layer is typically determined under an assumption that the whole Pool2 output is computed before progresses to the next layers. In general, if there are additional layers after Pool2, then it may not be necessary to generate all of the outputs of the Pool2 layer. In some embodiments, when a number of outputs of Pool2 computed (e.g., sub-outputs) hits a threshold value, the additional layers after the Pool2 layer can begin execution in the following layers, and the memory of this Pool2 sub-output. In these embodiments, the amount of memory required for the output of Pool2 can depend on how quickly the generated sub-outputs of Pool2 are being processed by other layers.

In some embodiments, for a CNN having CONV1 layer with 128 features, POOL1 layer that is 2×2, a CONV2 layer with 256 features and a POOL2 layer 2×2, executed on a 10-core CPU with 1 MB of L2 cache, for a single user input of dimensions 2227×227×3 and memory size of 618 KB, the invention can allow for a total network size requirement of ~3.9 MB versus the prior art sequential layer based execution which can require a total network size requirement of ~50 MB. In this scenario, the invention can allow for ~12 times less memory required.

One skilled in the art will realize the invention can be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

Although embodiments of the invention are not limited in this regard, the terms "plurality" and "a plurality" as used herein can include, for example, "multiple" or "two or more". The terms "plurality" or "a plurality" can be used throughout the specification to describe two or more components, devices, elements, units, parameters, or the like. The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

What is claimed is:

1. A method for computing one or more outputs of a neural network having a plurality of layers, the method comprising:
analyzing, by a computing device, the neural network to determine a plurality of sub-computations from total computations of the neural network, wherein determining each sub-computation comprises:
i) determining a group of outputs for each sub-computation;
ii) for each group of outputs, determining a largest number of inputs that are necessary to compute the group of outputs and results in a memory requirement less than a threshold; and
computing the outputs of the neural network by executing each sub-computation.

2. The method of claim 1 wherein executing each sub-computation further comprises identifying a set of corresponding cores that together have a cache memory size that is at least the threshold.

3. The method of claim 2 wherein the cache memory size is a L2 or L3 cache memory size.

4. The method of claim 2 wherein the cache memory size is total cache size needed by the neural network to execute the computations of any intermediate layer of the respective sub-computations of the neural network.

5. The method of claim 4 wherein determining the largest number of inputs in some preceding layer that are necessary to compute the respective group of outputs and results in a memory requirement less than a threshold further comprises:
receiving a bottom layer;
adding all outputs in each layer neural network from the start layer traversing the bottom layer that contribute to computing the one previously unselected output into the group of outputs; and
comparing the group of outputs to the threshold.

6. The method of claim 1 wherein determining a group of outputs for each sub-computation further comprises receiving a start layer and selecting one previously unselected output from the start layer to add to the group of outputs.

7. The method of claim 1 further comprising:
determining each repeated computation in the plurality of sub-computations;
executing each repeated computation only once;
storing a result of each repeated computation; and
reusing the result of each repeated computation for each sub-computation of the plurality of sub-computations that has not yet executed and has a computation that is the same as any of the repeated computations with stored results.

8. The method of claim 7 wherein at least some of the each repeated computations in the plurality of sub-computations is stored on a shared memory multiprocessor and accessed by multiple computing cores.

9. The method of claim 1 wherein the plurality of sub-computations are grouped into workspaces and wherein each workspace is assigned a set of cores to execute on.

10. The method of claim 1 further comprising determining whether to avoid computing one or more computations that repeat in the plurality of computations based on a repeat ratio, wherein the repeat ratio is based on the number of computations in the neural network and the number of computations that are repeat computations.

11. The method of claim 1 wherein computing the outputs of the neural network by executing each sub-computation further comprises writing outputs from computations other than a final output layer of the neural network into cache only.

12. The method of claim 1 wherein computing the outputs of the neural network by executing each sub-computation further comprises reading outputs from computations other than a final output layer of the neural network from cache only.

13. The method of claim 1 wherein the neural network is a convolutional neural network.

14. The method of claim 1 wherein the plurality of layers is any combination of a direct convolutional layer, Fast Fourier Transform layer, Winograd Transform layer, any pooling layer, any non-element-wise layer, element-wise-layer, and any Fully-Connected layer.

15. The method of claim 1 wherein the plurality of layers is a sparsification of an original network layer.

16. A system comprising an improved convolutional neural network (CNN), the CNN comprising:
a memory; and
a processor; the processor configured to:
analyzing, by a computing device, the neural network to determine a plurality of sub-computations from total computations of the neural network, wherein determining each sub-computation comprises:

iii) determining a group of outputs for each sub-computation;
iv) for each group of outputs, determining a largest number of inputs that are necessary to compute the group of outputs and results in a memory requirement less than a threshold; and
computing the outputs of the neural network by executing each sub-computation.

17. The system of claim 16 further comprising:
determining each repeated computation in the plurality of sub-computations;
executing each repeated computation only once;
storing a result of each repeated computation; and
reusing the result of each repeated computation for each sub-computation of the plurality of sub-computations that has not yet executed and has a computation that is the same as any of the repeated computations with stored results.

18. The system of claim 17 wherein at least some of the each repeated computations in the plurality of sub-computations is stored on a shared memory multiprocessor and accessed by multiple computing cores.

19. A non-transitory computer readable storage medium storing a set of instructions for causing a computer to generate a performance rating for a developer, by performing the operations of:
analyzing a neural network to determine a plurality of sub-computations from total computations of the neural network, wherein determining each sub-computation comprises:
v) determining a group of outputs for each sub-computation;
vi) for each group of outputs, determining a largest number of inputs that are necessary to compute the group of outputs and results in a memory requirement less than a threshold; and
computing the outputs of the neural network by executing each sub-computation.

20. The non-transitory computer readable storage medium of claim 19 wherein executing each sub-computation further comprises identifying a set of corresponding cores that together have a cache memory size that is at least the threshold.

* * * * *